May 5, 1959 J. A. JAWETT 2,884,784
LIQUID LEVEL GAUGE
Filed Sept. 14, 1956 2 Sheets-Sheet 1
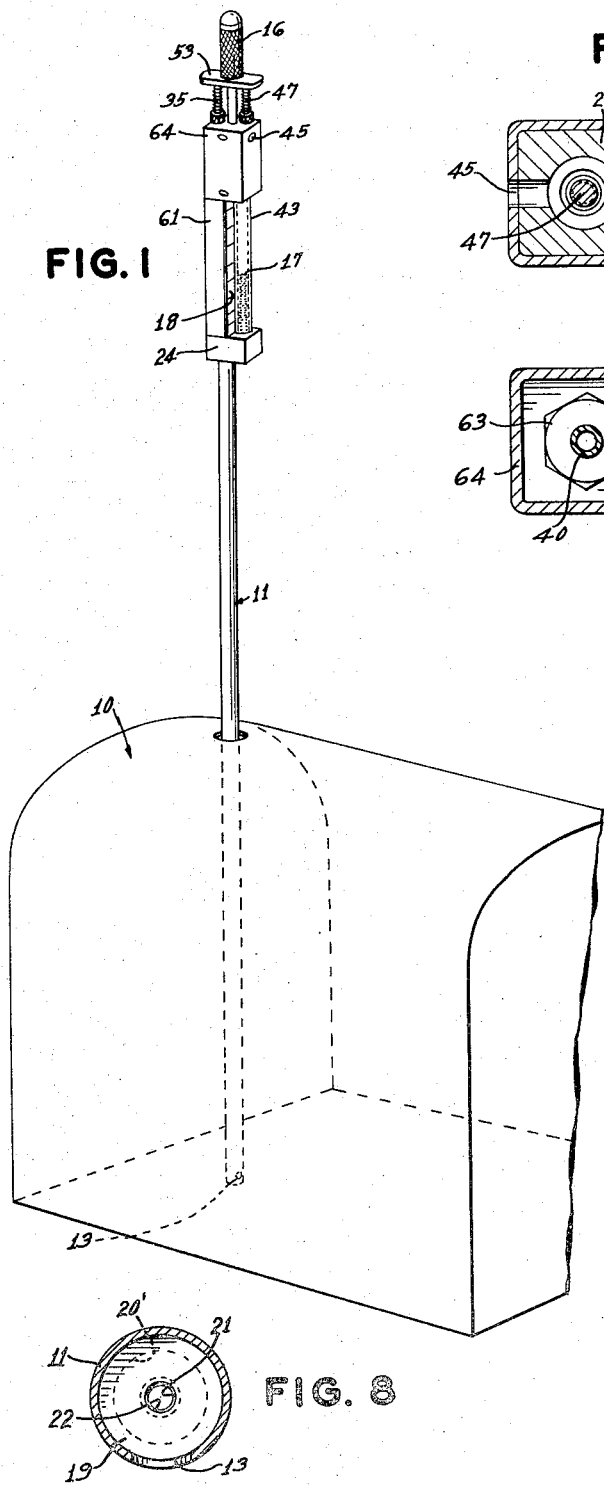
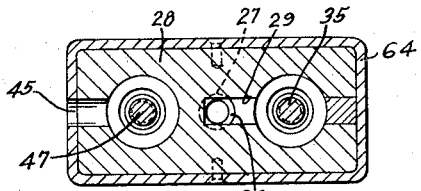
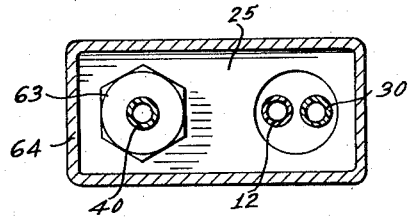
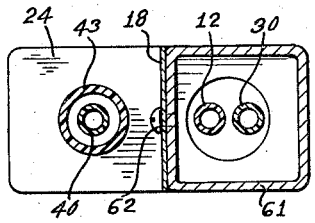
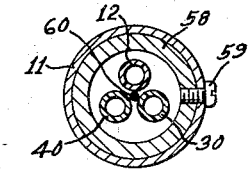
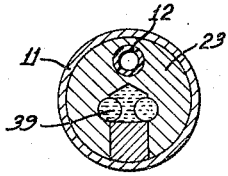
INVENTOR.
Joseph A. Jawett
BY
ATTORNEYS

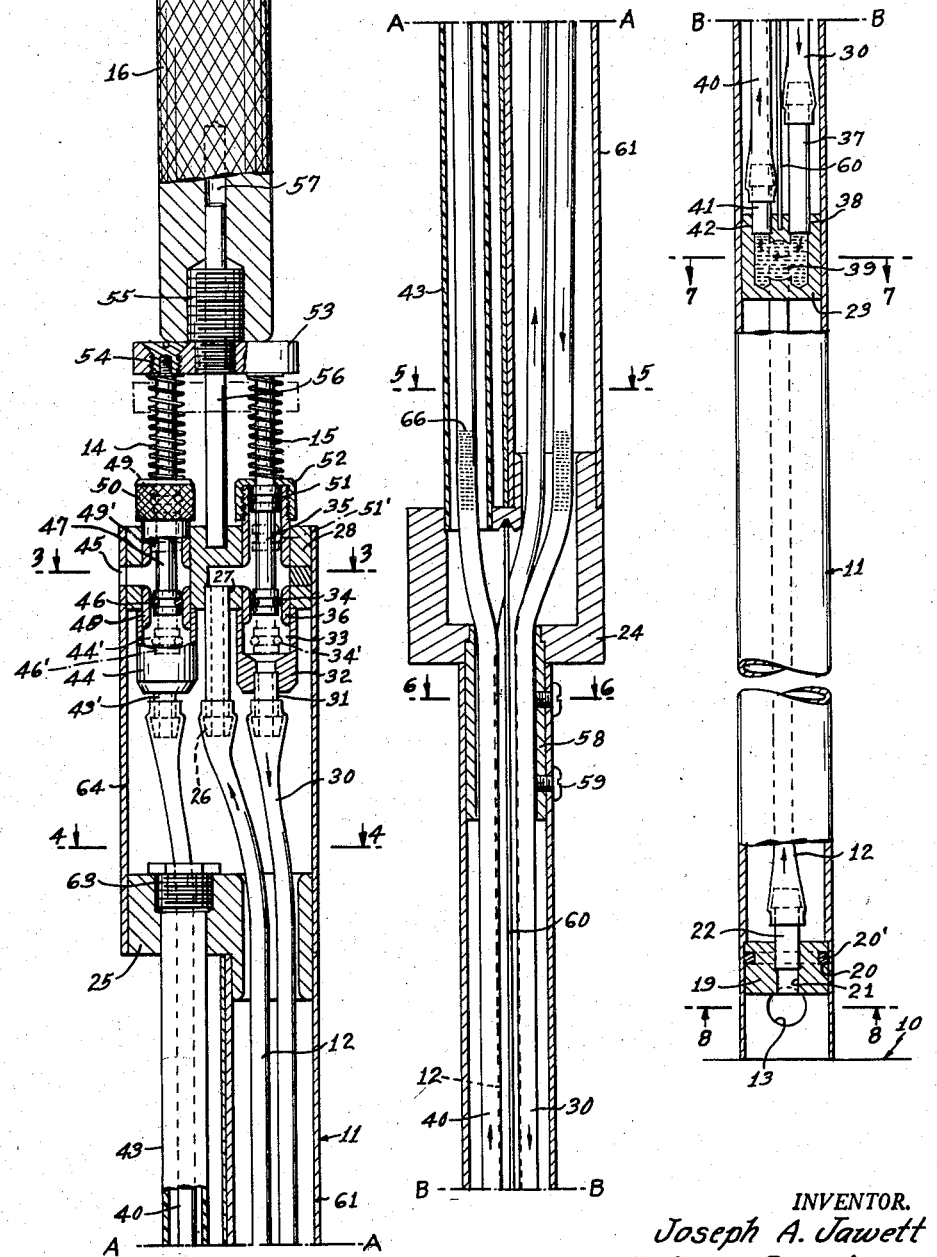

United States Patent Office 2,884,784
Patented May 5, 1959

2,884,784

LIQUID LEVEL GAUGE

Joseph A. Jawett, Flushing, N.Y., assignor to Petrometer Corporation, Long Island City, N.Y., a corporation of New York Application September 14, 1956, Serial No. 609,933

6 Claims. (Cl. 73—299)

This invention relates to a liquid level gauge, and relates more particularly to an improved portable liquid level gauge for use in measuring the height of a liquid in a tank or other receptacle.

An object of this invention is the provision of a portable liquid gauge for measuring the height of a liquid in a tank or other receptacle which is simple in construction and efficient in use.

Another object of this invention is to provide an improved liquid level gauge having means for retaining the measurement reading after the gauge has been removed from the liquid being measured.

Other objects of this invention, together with certain details of construction and combinations of parts, will be apparent from the following description and claims.

Generally, my liquid level gauge comprises a valve structure having a pair of valves to which valve structure is connected a fluid transmission line or tube mounted in a probe, and also the legs of a manometer U-tube. The fluid transmission line and the legs of the manometer U-tube may be made of a suitable plastic material. A feature of my invention is the use in the liquid valve gauge of a handle which is operatively connected to the spring-biased valve stems of the valves, which handle may operate the said valves.

Another feature of my invention is the use of a valve structure having valves which, when closed, cause the measurement reading to be maintained as long as desired. Thus, with the gauge in the liquid being measured, by releasing the pressure on the handle after the indicating liquid has risen to give a reading on the calibrated scale of the height of the liquid in the receptacle, the valves are simultaneously closed. With the valves closed, the measurement reading is retained, after the gauge is withdrawn from the receptacle. This is a highly desirable feature since, for example, the gauge may be employed in a poorly lighted place and the measurement reading taken may be read in a well-lighted place removed from the area of the receptacle.

Another feature of my liquid level gauge is that it is of light weight and simple construction so that it is readily portable and may be used in place of a "dip-stick."

In the drawings, wherein a preferred embodiment of my invention is shown,

Fig. 1 is a perspective view showing the liquid level gauge of the instant invention in use, Fig. 2 is a view, substantially wholly in section, of the gauge shown in Fig. 1, Fig. 3 is a sectional view taken along line 3—3 of Fig. 2, Fig. 4 is a sectional view taken along line 4—4 of Fig. 2, Fig. 5 is a sectional view taken along line 5—5 of Fig. 2, Fig. 6 is a sectional view taken along line 6—6 of Fig. 2, Fig. 7 is a sectional view taken along line 7—7 of Fig. 2, and Fig. 8 is a sectional view taken along line 8—8 of Fig. 2.

Referring now to drawings for a detailed description of my invention, there is shown in Fig. 1 the gauge inserted in a liquid storage tank 10 with the receiving tube or probe 11, containing a fluid transmission line or tube 12, resting at the bottom of said tank. The wall of probe 11 is provided near the bottom thereof with an opening 13 to prevent the accumulation of sludge or other undesirable material in the end of the probe which would tend to cause clogging. As shown in the drawings, the gauge is in open position, with the springs 14 and 15 and handle 16 in their retracted position as, for example, when a measurement of the level of the liquid in the tank is being taken, which measurement is indicated at 17 on a calibrated scale 18.

Just above the lower end of probe 11 is friction-fitted a block 19 provided with a groove 20 for the reception of a sealing ring 20'. The block 19 has a hole 21 centrally thereof for the passage therethrough to the transmission line 12 of the liquid whose level is being measured, as the gauge is lowered into the body of the liquid. In the upper end of hole 21 is friction-fitted a nipple 22 to which is attached the lower end of transmission line 12. The transmission line 12 passes through suitable openings in block 23, also frictionally held in probe 11, bracket 24 and block 25, and the upper end thereof is attached to a nipple 26 which is fixed in a hole 27 in apertured block 28, which hole communicates with passageway 29 running laterally of block 28. The gauge is provided with a manometer U-tube the upper end of the pressure leg 30 of which is attached to a nipple 31 inserted in valve body 32 provided with a chamber 33. Passage of the fluid, which may be compressed air, from transmission line and passageway 29 to the chamber 33 is controlled by movement of the sealing O-ring 34 suitably mounted on movable valve stem 35. As shown in Fig. 2, the valve stem is in normal retracted position with the O-ring 34, cooperating with valve seat or bushing 36 to close the valve, and at 34' said O-ring is shown in position when the valve stem is depressed to open the valve.

The pressure leg 30 of the manometer U-tube passes downwardly through the openings in block 25 and in bracket 24 and is connected to nipple 37 mounted in bore 38 in block 23. Bore 38 communicates with a well 39 in said block 23, which well functions as the bottom bend of the manometer U-tube. The lower end of indicating leg 40 of the manometer U-tube is fitted over a nipple 41 inserted in bore 42 which communicates with the well 39. The indicating leg 40 passes through bracket 24 and through a sight glass 43 and is attached at its upper end to nipple 43' inserted in valve body 44 provided with a chamber 44'. Passage of the indicating fluid in indicating leg 40 from chamber 44' to vent 45 in block 28, which vent is open to the atmosphere, is controlled by sealing O-ring 46 suitably mounted on movable valve stem 47. This valve stem is in normal retracted position with the O-ring 46 cooperating with valve seat or bushing 48 to close the valve, and at 46' said O-ring is shown moved to the position when the valve stem 47 is depressed to open the valve.

The upper part of each of the valve stems 37 and 47 extend through bearing-containing openings provided in block 28. A sealing O-ring 49, shown as 49' in its open position, and a retaining nut 50 sealing the opening through which valve stem 47 extends, while O-ring 51, shown as 51' in open position, and retaining nut 52 seals the opening through which valve stem 35 extends. The upper ends of valve stems 35 and 47 are fastened to a tie bar 53 by means of screws 54. Handle 16 is fixed to the tie bar by a bolt 55 which is apertured to receive a guide rod 56, held in block 28, extending through said bolt 55 and into a bore 57 in said handle 16 which registers with the aperture in bolt 55. As will be appreciated, the handle 16 will slide on guide rod 56 when moved to operate the valves.

Certain structural details of my liquid gauge will be apparent from the drawings, particularly from the cross-sectional views in connection with Fig. 2. Thus, from Figs. 2 and 6, it will be seen that the probe 11 is removably fastened to a bushing 58, carried by bracket 24, by means of screws 59, and that block 23 is held in spaced relation to bracket 24 by means of a rod 60. Figs. 2 and 5 show that the bracket 24 and block 25 are separated by a substantially square tube 61 through which extend transmission line 12 and pressure leg 30 and to the outside of which tube 61 is fixed calibrated scale 18 as by means of screw or screws 62. These views also show the sight glass 41 held between bracket 24 and block 25 by a retaining nut 63 threaded into block 25. It will be seen from Figs. 2, 3 and 4 that blocks 25 and 28 are held in spaced relation by means of a rectangular tube 64.

While the transmission line 12 and the legs of the manometer tube may be made of any suitable material, it is preferred to use tubes of transparent flexible plastic material such as polyethylene, polystyrene or other suitable synthetic polymeric material. With regard to the metallic elements employed herein, it is preferred to make the same of aluminum or other material, metallic or otherwise, which is resistant to the action of the liquid being measured. It will, of course, be understood that the portion of the indicating leg within the sight glass adjacent to the calibrated scale must be transparent, and that other portions of said indicating leg and the whole of the pressure leg and the transmission line may be translucent, colored or opaque synthetic plastic material, or of any other suitable material.

In operation, my portable liquid level gauge, having its manometer U-tube filled with liquid to the desired level, as is shown at 66 in Fig. 2, is inserted into the tank or other container, in which the liquid to be measured is stored, until the probe 11 rests on the bottom thereof. As the probe is being inserted, valves are normally closed. However, when the probe reaches the bottom of the tank, the valves are opened, as by pressing handle 16 downwardly against the action of springs 14 and 15, and are held in open position until the level of the liquid in indicating leg 40 ceases to rise. The indicating liquid is caused to rise in the indicating leg 40 by the compressed air in transmission line 12 passing through valve body 32 to the pressure leg 30, which forces the indicating liquid further into indicating leg 40. The rising indicating liquid forces the air therefrom through valve body 44' and vent 45 to the atmosphere. The rise of the indicating liquid relative to the calibrated scale will be proportional to the height of the liquid in the tank. The scale 18 may, of course, be calibrated to correspond to the size of the tank so that the scale may register the quantity of liquid therein.

After the measurement has been taken, the instant device may be withdrawn with the valves still open, in which case, of course, the indicating liquid falls to its own level in the U-tube pressure gauge and the reading is lost. It is, however, one of the advantages of my invention that by releasing pressure on the handle after a measurement has been taken, whereby the valves are simultaneously closed, the device may be withdrawn from the vessel without losing the reading. This is in many cases highly advantageous and sometimes absolutely necessary, as for example when the measurement is taken under insufficiently illuminated conditions, and/or when a visual record of the liquid depth is desired or required. Being portable, my measuring device may be advantageously substituted for the ordinary "dipsticks" which are unsatisfactory for measuring the depth of a highly volatile liquid because of rapid evaporation thereof from the "dip-stick" before a reading can be taken.

It is to be understood that the foregoing detailed description is given merely by way of illustration and that many variations may be made therein without departing from the spirit of my invention.

Having described my invention what I desire to secure by Letters Patent is:

1. In a portable liquid level gauge of the dip stick type for measuring the height of a liquid in a receptacle and for indicating the measurement by means of an indicating fluid moving relative to a calibrated scale, the combination of a tube insertable into a liquid receptacle for transmitting a compressible fluid under pressure proportional to the height of liquid in the receptacle, and a manometer U-tube operatively connected to said fluid transmitting tube, and valve means in communication with said tubes for permitting said indicating fluid to register a measurement of the height of a liquid in the receptacle and for maintaining the measurement indication after the liquid gauge is removed from the liquid being measured, said valve means being normally closed and biased to closed position and movable to open position against said bias for obtaining the measurement indication of said indicating fluid, manual means for moving said valve to said open position, said valve means being closed automatically by said bias, upon release of said manual means, for maintaining said measurement indication by said fluid.

2. In a portable liquid level gauge of the dip stick type for measuring the height of a liquid in a receptacle and for indicating the measurement by means of an indicating fluid moving relative to a calibrated scale, the combination of a tube insertable into a liquid receptacle for transmitting a compressible fluid under pressure proportional to the height of liquid in the receptacle, and a manometer U-tube operatively connected to said fluid transmitting tube, and manually operated valve means in communication with said tubes for permitting said indicating fluid to register a measurement of the height of a liquid in the receptacle and for maintaining the measurement indication after the liquid gauge is removed from the liquid being measured, said valve means being normally closed and biased to closed position and movable to open position against said bias for obtaining the measurement indication of said indicating fluid, said valve means being closed automatically by said bias, upon release of said manual means, for maintaining said measurement indication by said fluid.

3. A portable liquid level gauge of the dip stick type for measuring the height of a liquid in a receptacle, comprising a manometer U-tube including a transparent indicating leg vented to the atmosphere and a pressure leg, a tube for transmitting a compressible fluid operatively connected to said manometer U-tube, and a pair of valves for simultaneously controlling the communication of said indicating leg with said atmosphere and said pressure leg with said fluid transmission tube, said valves being spring-biased to closed position whereby when the spring bias is overcome said valves are moved to open position to cause the indicating leg to communicate with the atmosphere and said pressure leg to communicate with said fluid transmission tube and when the springs are in normal position to close such communications, and releasable manual means normally held in retracted position by said spring bias in the closed condition of the valves and movable against said spring bias to open said valves, said valves being automatically closed by said spring bias when said manual means is released.

4. In a portable liquid level gauge of the dip stick type for measuring the height of a liquid in a receptacle and for indicating the measurement by means of an indicating fluid moving relative to a calibrated scale, the combination of a tube insertable into a liquid receptacle for transmitting a compressible fluid under pressure proportional to the height of liquid in the receptacle, and a manometer U-tube operatively connected to said fluid transmitting tube, and valve means in communication with said tubes for permitting said indicating fluid to register a measurement of the height of a liquid in the receptacle and for maintaining the measurement indication after the liquid gauge is removed from the liquid being measured, said valve means being normally closed and biased to closed position and movable to open position against said bias for obtaining the measurement indication of said indicating fluid, manual means for moving said valve to said open position, said valve means being closed automatically by said bias, upon release of said manual means, for maintaining said measurement indication by said fluid, said manual means being movable to retracted position by said spring bias automatically upon release of said manual means, and said indication being visible in the retracted position of said manual means.

5. In a portable liquid level gauge of the dip stick type for measuring the height of a liquid in a receptacle and for indicating the measurement by means of an indicating fluid moving relative to a calibrated scale, the combination of a tube insertable into a liquid receptacle for transmitting a compressible fluid under pressure proportional to the height of liquid in the receptacle, and a manometer U-tube operatively connected to said fluid transmitting tube, and manually operated valve means in communication with said tubes for permitting said indicating fluid to register a measurment of the height of a liquid in the receptacle and for maintaining the measurement indication after the liquid gauge is removed from the liquid being measured, said valve means being normally closed and biased to closed position and movable to open position against said bias for obtaining the measurement indication of said indicating fluid, said valve means being closed automatically by said bias, upon release of said manual means, for maintaining said measurement indication by said fluid, said manual means being movable to retracted position by said spring bias automatically upon release of said manual means, and said indication being visible in the retracted position of said manual means.

6. A portable liquid level gauge of the dip stick type for measuring the height of a liquid in a receptacle, comprising a manometer U-tube including a transparent indicating leg vented to the atmosphere and a pressure leg, a tube for transmitting a compressible fluid operatively connected to said manometer U-tube, and a pair of valves for simultaneously controlling the communication of said indicating leg with said atmosphere and said pressure leg with said fluid transmission tube, said valves being spring-biased to closed position whereby when the spring bias is overcome said valves are moved to open position to cause the indicating leg to communicate with the atmosphere and said pressure leg to communicate with said fluid transmission tube and when the springs are in normal position to close such communications, and releasable manual means normally held in retracted position by said spring bias in the closed condition of the valves and movable against said spring bias to open said valves, said valves being automatically closed by said spring bias when said manual means is released, said manual means being movable to retracted position by said spring bias automatically upon release of said manual means.

References Cited in the file of this patent

UNITED STATES PATENTS

| | | |
|---|---|---|
| 1,867,216 | Forney | July 12, 1932 |
| 2,167,449 | Ganser | July 25, 1939 |
| 2,411,508 | Dwyer | Nov. 26, 1946 |